(12) United States Patent
Mukkala, II et al.

(10) Patent No.: US 10,053,094 B2
(45) Date of Patent: Aug. 21, 2018

(54) ANALYTIC DESIGN OF PEDAL OVERRIDE FOR ADJUSTABLE SPEED LIMITING

(71) Applicant: Ford Global Technologies, LLC, Dearborn, MI (US)

(72) Inventors: Benjamin Carl Mukkala, II, Ann Arbor, MI (US); Roy Schafer, Saline, MI (US); Andreas Ediger, Cologne (DE); Benjamin Baecker, Nordrhein-Westfalen (DE); Stephen Cole, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/095,669

(22) Filed: Apr. 11, 2016

(65) Prior Publication Data

US 2017/0291604 A1 Oct. 12, 2017

(51) Int. Cl.
*B60W 30/14* (2006.01)

(52) U.S. Cl.
CPC ........ *B60W 30/143* (2013.01); *B60W 30/146* (2013.01); *B60W 30/14* (2013.01)

(58) Field of Classification Search
None
See application file for complete search history.

(56) References Cited

U.S. PATENT DOCUMENTS

| 6,581,710 | B2 | 6/2003 | Sprinkle et al. | |
|---|---|---|---|---|
| 7,204,230 | B2 | 4/2007 | Bevan et al. | |
| 9,308,914 | B1* | 4/2016 | Sun | B60K 28/06 |
| 2014/0121930 | A1* | 5/2014 | Allexi | B60W 50/10 |
| | | | | 701/70 |
| 2016/0039415 | A1* | 2/2016 | Brockley | B60W 50/06 |
| | | | | 701/94 |

FOREIGN PATENT DOCUMENTS

| DE | 102011113909 A1 | 3/2012 |
|---|---|---|
| JP | 08156641 | 6/1996 |
| JP | 2012017717 A | 1/2012 |

OTHER PUBLICATIONS

Search Report dated Aug. 25, 2017 for Great Britain Patent Application No. GB1704556.8 (4 Pages).

* cited by examiner

*Primary Examiner* — Lail A Kleinman
(74) *Attorney, Agent, or Firm* — James P. Muraff; Neal, Gerber & Eisenberg LLP (57) ABSTRACT

A system for overriding a vehicle speed limit setting via accelerator pedal override is disclosed, comprising a vehicle including steering, an accelerator pedal, brakes, a processor, and memory, and a vehicle speed limit override module coupled to the processor and configured to override the speed limit setting by calculating an override threshold based on the set speed limit and accounting for variable vehicle weight, road grade or other unknown loads.

20 Claims, 9 Drawing Sheets

ANALYTIC DESIGN OF PEDAL OVERRIDE FOR ADJUSTABLE SPEED LIMITING

BACKGROUND

This application relates generally to the field vehicle acceleration management systems, and more particularly to accelerator pedal override systems.

Automobiles may be made available with convenience functions similar to cruise control, known as driver adjustable vehicle speed limiting (VSL) functions. These functions are known by their marketing names as Adjustable Speed Limiter (ASL or ASLD) and Intelligent Speed Limiter (ISL). The purpose of these functions is to allow the driver to set a desired vehicle speed limit when they are driving. ASL and ISL are similar to cruise control with the main difference being the driver is setting a vehicle speed limit rather than a set speed. The driver can then drive normally with confidence that the vehicle will not inadvertently exceed the desired speed limit. This is particularly useful in areas where roadway speed limits are strictly enforced.

Ordinarily, once the vehicle speed reaches the speed limit, the ASL ignores further increases in the accelerator pedal position by the driver to maintain the set speed limit. The driver may nevertheless expect that if they press the accelerator pedal far enough, they will be able to override and exceed the desired speed limit. Such override mechanisms present several challenges, including an undesirable surge in vehicle acceleration once the override mechanism engages, undesirable dead pedal feel during pedal override, and undesirable vehicle performance characteristics during transition back to the vehicle set speed limit.

There exists a need, therefore, for an accelerator pedal override system which solves these problems.

SUMMARY

An embodiment of a system for overriding a vehicle speed limit setting via accelerator pedal override is disclosed, comprising a vehicle including steering, an accelerator pedal, brakes, a processor, and memory, and a vehicle speed limit override module coupled to the processor and configured to override the speed limit setting by calculating an override threshold based on the set speed limit and accounting for variable vehicle weight, road grade or other unknown loads.

The vehicle speed limit override module may be configured to receive pedal position data. The pedal position data may include pedal override position data associated with initiation of pedal override based on the set speed limit and vehicle load conditions. The vehicle speed limit override module may be configured to provide feedback to a driver to indicate that pedal override has occurred. The feedback may include a desired vehicle acceleration offset from a current vehicle acceleration to enable a driver to feel when pedal override is triggered. The vehicle speed limit override module may be configured to exit pedal override when a pedal override acceleration request associated with an increasing pedal position becomes greater than a driver demand acceleration request. The vehicle speed limit override module may be configured to exit pedal override when a pedal override acceleration request associated with a decreasing pedal position becomes less than a pedal override trigger point and greater than a driver demand acceleration request.

In another embodiment, a system for overriding a vehicle speed limit setting via accelerator pedal override is disclosed, comprising a vehicle including steering, an accelerator pedal, brakes, a processor, and memory, and a vehicle speed limit override module coupled to the processor and configured to rescale a pedal override position to 50% of a total available rescaled pedal travel after initiation of pedal override of the speed limit setting to compensate accelerator pedal travel range.

The vehicle speed limit override module may be configured to receive pedal position data from a pedal position sensor. The pedal position data may include pedal override position data associated with initiation of pedal override based on the set speed limit and vehicle load conditions. The vehicle speed limit override module may be configured to provide feedback to a driver to indicate that pedal override has occurred. The feedback may include a desired vehicle acceleration offset from a current vehicle speed that provides a relatively smooth transition from speed limiting to vehicle acceleration due to initiation of pedal override. The vehicle speed limit override module may be configured to exit pedal override when a pedal override acceleration request associated with an increasing pedal position becomes greater than a driver demand acceleration request. The vehicle speed limit override module may be configured to exit pedal override when a pedal override acceleration request associated with a decreasing pedal position becomes less than a pedal override trigger point and greater than a driver demand acceleration request.

In another embodiment, a system for overriding a vehicle speed limit setting via accelerator pedal override is disclosed, comprising a vehicle including steering, an accelerator pedal, brakes, a processor, and memory, and a vehicle speed limit override module coupled to the processor and configured to rescale a pedal override position to 50% of a total available rescaled pedal travel after initiation of pedal override of the speed limit setting to compensate accelerator pedal travel range, wherein vehicle acceleration smoothly transitions from speed limiting to vehicle acceleration after initiation of pedal override.

The vehicle speed limit override module may be configured to receive pedal position data from a pedal position sensor. The pedal position data may include pedal override position data associated with initiation of pedal override based on the set speed limit and vehicle load conditions. On a tip-out of the pedal while in override, the vehicle speed limit override module may be configured to cause an increase in acceleration of the vehicle to return on subsequent tip-in of the pedal. The vehicle speed limit override module may be configured to exit pedal override when a pedal override acceleration request associated with an increasing pedal position becomes greater than a driver demand acceleration request. The vehicle speed limit override module may be configured to exit pedal override when a pedal override acceleration request associated with a decreasing pedal position becomes less than a pedal override trigger point and greater than a driver demand acceleration request.

DETAILED DESCRIPTION

Although the figures and the instant disclosure describe one or more embodiments of an accelerator pedal override system for use in connection with vehicle speed limiting systems, one of ordinary skill in the art would appreciate that the teachings of the instant disclosure would not be limited to these embodiments.

For purposes of this disclosure:

$\Theta_{PEDAL}$—current, unscaled, pedal position.

$\Theta_{SCALED\_PEDAL}$—accelerator pedal position scaled such that the pedal override trigger point maps to, for example, 50% in the rescaled pedal.

$\Theta_{PEDAL@SL}$—accelerator pedal position at the desired vehicle speed limit.

$\Theta_{SCALED\_PEDAL@PO}$—the rescaled pedal position that maps the pedal override trigger point to 50% in scaled pedal position.

$\Theta_{PedalOverride}$—pedal position at pedal override.

$\Theta_{PedalOverrideNEW}$—new pedal override trigger point due to pedal decompression.

$a_{Offset}$—the desired acceleration offset for the "seat of the pants" feel when pedal override is triggered.

$a_{PO}$—the pedal override acceleration request resulting from the pedal override acceleration limit as a function of pedal position.

$a_{PedalOverride}$—the pedal override acceleration request resulting from the pedal override acceleration limit as a function of pedal position.

$\Theta_{RESCALED\_PEDAL}$—the rescaled pedal position used as the input for the pedal override acceleration request function.

$a_{DriverDemand}$—the acceleration request from normal driver demand operation.

$a_{REQUEST}$—the final acceleration request arbitrated between speed limiting, pedal override and normal driver demand acceleration requests.

$a_{speedLimiter}$—the acceleration request resulting from speed limiting operation.

Tip-out—driver decreasing the pedal position.

Tip-in—driver increasing the pedal position.

$V_{LIMIT}$—desired speed limit, also referred to as VSL.

VSL—desired speed limit, also referred to as $V_{LIMIT}$.

$F_{AD@SL}$—force due to aerodynamic drag at the speed limit.

$F_{RR@SL}$—force due to rolling resistance at the speed limit.

$F_{wheel@SL}$—tractive force at the wheel of the vehicle at the speed limit.

$F_{NET}$—net force on the vehicle.

$F_{UNKNOWN}$—Unknown forces primarily due to added vehicle mass and road grade.

$T_{ENG@SL}$—Engine torque at the desired speed limit.

$\mu_{FD}$—final drive ratio (i.e. differential ratio).

$\mu_{TRANS}$—transmission gear ratio.

$\mu_{CONV}$—torque convertor ratio $r_{wheel}$—wheel radius $T_{Losses}$—torque losses in the powertrain $n_{ENG@SL}$—Engine speed at the desired speed limit $\Theta_{SL\_NOMINAL}$—pedal position at the desired speed limit under nominal vehicle conditions $\Theta_{RG\_COMP}$—pedal compensation for unknown force $F_{UNKNOWN}$.

$\Theta_{PEDAL@PO}$—pedal position at pedal override.

$\Theta_{MRGN}$—margin above $\Theta_{PEDAL@SL}$ used to determine pedal override trigger point.

$a_{SL\_RQ\_FINAL}$—speed limiter acceleration request at the point pedal override is triggered.

$V_{ERROR@PO}$—the vehicle speed error for speed limiting at the point pedal override is triggered $a_{PO\_INIT}$—the initial acceleration request for the pedal override acceleration request when at the point pedal override is triggered.

Driver demand—The acceleration or torque request from the driver pressing the accelerator pedal.

The primary function performed for a vehicle Adjustable Speed Limiter (ASL or ASLD) and Intelligent Speed Limiter (ISL) is to prevent the vehicle speed from exceeding a driver selected desired speed limit (referred to herein as VSL or $V_{LIMIT}$). But the driver also expects that if they press the accelerator pedal far enough, they can accelerate the vehicle again and exceed $V_{LIMIT}$. For some pedal position (and a given set of vehicle conditions), the vehicle speed will be at $V_{LIMIT}$ and further pedal travel does not result in increased vehicle speed. For purposes herein, that pedal position will be defined as $\Theta_{PEDAL@SL}$.

$\Theta_{PEDAL@SL}$ marks the beginning of actively limiting the vehicle speed. This is the basis for the pedal override trigger point. As the pedal position continues to increase beyond $\Theta_{PEDAL@SL}$, so does the normal driver demand acceleration request. The driver demand acceleration request is diverging from the speed limiter acceleration request (which is zero at $V_{LIMIT}$).

Pedal travel beyond $\Theta_{PEDAL@SL}$ will result in what may be referred to as pedal compression. As the driver continues to press the pedal further, at some point pedal override of $V_{LIMIT}$ may occur. For a given $V_{LIMIT}$, pedal override may be some margin above $\Theta_{PEDAL@SL}$ which may be intuitive to the driver.

To trigger pedal override by a driver, a back calculation from the current $V_{LIMIT}$ to the pedal position is desirable to maintain the current $V_{LIMIT}$ under current conditions, $\Theta_{PEDAL@SL}$ There will be a margin above $\Theta_{PEDAL@SL}$ before the transition to pedal override occurs in order to satisfy the primary function, speed limiting. For purposes herein, that margin is defined as $\Theta_{MRGN}$. In some embodiments, the value of $\Theta_{MRGN}$ may be determined via a statistical sampling of a large enough number of drivers in a survey.

To determine $\Theta_{PEDAL@SL}$, a calculation of the inverse of the driver demand function may be possible:

$$F_{NET} = F_{wheel@SL} + F_{AD@SL} + F_{RR@SL} + F_{UNKNOWN}$$

$$T_{ENG@SL} = \mu_{FD} \times \mu_{TRANS} \times \mu_{CONV} \times F_{wheel@SL} \times r_{wheel} + T_{Losses}$$

$$\Theta_{PEDAL@SL} = f^{-1}(T_{ENG@SL}, n_{ENG@SL})$$

The calculation from engine torque to pedal position may utilize inverse look-up functions. Alternatively, the $\Theta_{PEDAL@SL}$ may be approximated. For example, one approach may include starting with a function that returns a nominal pedal position, $\Theta_{SL\_NOMINAL}$ for standard temperature and pressure conditions on a level road with nominal vehicle weight and nominal rolling resistance based at $V_{LIMIT}$.

$$\Theta_{SL\_NOMINAL} = f_{NOMINAL}(V_{LIMIT})$$

Assuming that the inverse function is linear and the component $F_{UNKNOWN}$ maps to a corresponding change in pedal position that enters into the final pedal position calculation additively. An approximation of that function is:

$$\Theta_{RG\_COMP} = f(F_{UNKNOWN})$$

Then, the $\Theta_{SL\_NOMINAL}$ could be compensated for $F_{UNKNOWN}$ as follows:

$$\Theta_{PEDAL@SL} = \Theta_{SL\_NOMINAL} + \Theta_{RG\_COMP}$$

For purposes herein, the pedal position where override occurs may be defined as $\Theta_{PEDAL@PO}$ according to the following equation:

$$\Theta_{PEDAL@PO} = \Theta_{PEDAL@SL} + \Theta_{MRGN} \text{ (provides a consistent pedal override position)}$$

Now that we know when pedal override may be triggered, the next question is what to do during pedal override. In one embodiment, it may be desirable to return to normal pedal behavior when the driver transitions into pedal override. If the driver demand acceleration request is below the VSL control acceleration request, the VSL is not in control because the normal driver demand is in control. In that situation, pedal override is not needed.

But it is possible that driver demand acceleration request is above the VSL control acceleration request. In this event, a process to transition back to normal driver demand may be desirable, and optimally via a smooth transition from VSL to driver demand, preferably with no discontinuities in engine torque request that would cause a powertrain clunk or sudden surge in vehicle speed. To the driver, the pedal should feel normal or near normal until normal driver demand can be restored, and preferably without any large or discontinuous increase in torque request during pedal override operation and without a dead pedal feel to the driver during pedal override operation. In addition, the vehicle should preferably register a constant acceleration request for a constant pedal position, and increasing pedal beyond $\Theta_{PEDAL@PO}$ should preferably result in an increasing acceleration request. Similarly, decreasing pedal below $\Theta_{PEDAL@PO}$ should preferably result in decreasing acceleration request. Upon triggering pedal override, there should preferably be feedback to the driver pedal override has been triggered, a "seat of the pants" feel. At wide open pedal, wide open throttle may be achieved. At closed pedal, minimum torque request may be achieved. Well behaved exit transitions back to driver demand may be preferable.

We have been controlling the acceleration request to maintain the VSL. During pedal override, the VSL acceleration request may be returned to the driver demand acceleration request. Returning all of the driver demand acceleration when pedal override is entered may result in a surging vehicle as the acceleration transitions from (nominally) 0 to a relatively large amount determined by the current pedal position, which may not be optimal for the driver.

Another option is to pick up driver demand at the point speed limiting was entered—$\Theta_{PEDAL@SL}$- and add the pedal travel above $\Theta_{PEDAL@PO}$ to it. But this may result in a reduced acceleration request that may not achieve maximum acceleration at 100% pedal, which may not be optimal for the driver.

Another consideration when trying to use a modified version of normal driver demand is that it is an engine torque request. The performance feel may be inconsistent from one pedal override event to the next as the driver demand acceleration request is dependent on current road conditions. Consequently, the instant disclosure discloses a process that provides a pseudo-normal pedal behavior and transitions from VSL control back to the driver demand to provide a consistent pedal feel for the driver.

During speed limiting operation an acceleration request may be determined based on vehicle speed error. Once pedal override is entered, vehicle speed error may not be relevant anymore. Instead, what may be relevant is returning to normal driver demand operation. But, it is not preferable to suddenly switch to normal driver demand because of the likelihood of discontinuity in the torque request. Preferably, the transition back to driver demand should feel as close to a normal driver demand as much as possible (i.e. pseudo-normal). For seamless operation, the starting point for a pedal override acceleration request may begin at the last speed limiter acceleration request which may typically, but not necessarily, be 0.

While in pedal override, system behavior may preferably be:

1. The vehicle at the speed limit typically has 0 acceleration, and vehicle speed could be less than or greater than the speed limit. Therefore, to account for the speed limiter acceleration request when transitioning to pedal override:

$$a_{SL\_RQ\_FINAL} = f_{SL}(V_{ERROR@PO})$$

(at pedal override, $V_{ERROR}$ may not be relevant anymore but the acceleration request at pedal override entry may be relevant.)

2. The driver may want some acceleration immediately and without the feeling of a dead pedal. When pedal override is achieved, the speed limiter acceleration request may be increased by a meaningful amount to provide a "seat of the pants" feel so entry into pedal override is recognized:

$$a_{PO\_INIT} = a_{SL\_RQ\_FINAL} + a_{Offset}$$

(this is where the acceleration request may begin in pedal override.)

3. The driver may want a normal pedal feel. The transition back to normal driver demand should preferably be transparent. A function that can perform this is as follows:

$$a_{PO} = f_{PO}(\Theta_{PEDAL}) + a_{PO\_INIT}$$

(thus, the acceleration limit may go from initial to maximum when the pedal travels from the $\Theta_{PEDAL@PO}$ to 100% pedal, and which allows for deceleration when the pedal goes below $\Theta_{PEDAL@PO}$ to 0% pedal.)

4. $f_{PO}(\Theta_{PEDAL})$ may then continue limiting acceleration request during pedal override and provide the pseudo-normal accelerator pedal feel. But $\Theta_{PEDAL@PO}$ may vary based on the desired speed limit and may result in different initial acceleration requests when pedal override is triggered. Thus, for consistency of acceleration response, the pedal may be re-scaled for $f_{PO}$ ($\ominus_{PEDAL}$). In one embodiment, re-scaling such that $\ominus_{PEDAL@PO}$ may map to 50% in $f_{PO}$ ($\ominus_{PEDAL}$). For purposes herein, the rescaled pedal will be defined as $\ominus_{RESCALED\_PEDAL}$.

Turning now to the drawings wherein like reference numerals refer to like elements, there are shown exemplary embodiments and methods for providing pseudo-normal pedal behavior during pedal override and during transition out of pedal override and back to normal driver demand.

Figure 1A:
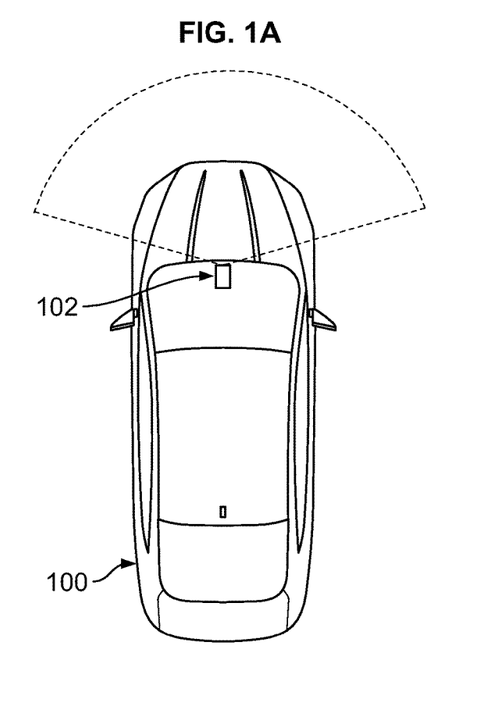
FIG. 1A illustrates a top view of a vehicle of the instant disclosure.
Figure 1B:
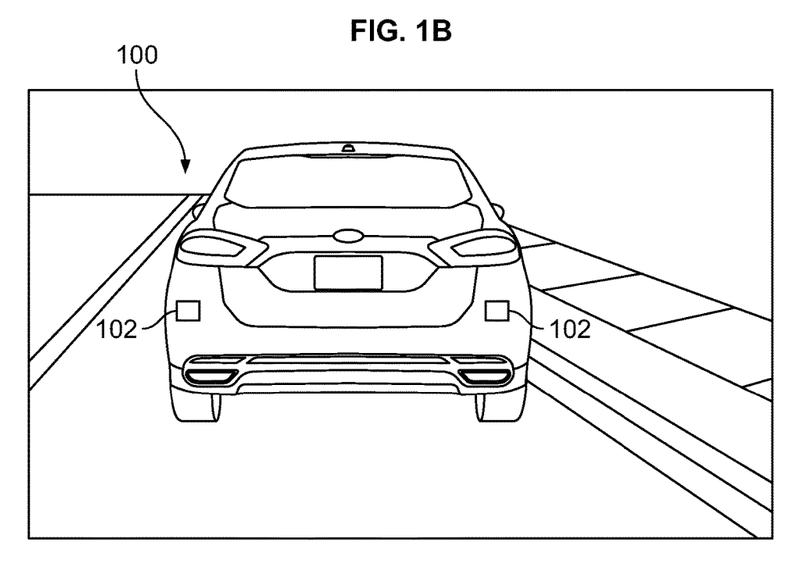
FIG. 1B illustrates a rear view of the vehicle shown in FIG. 1A.

FIGS. 1A-1B show vehicle 100 in accordance with one embodiment of the instant disclosure. In this embodiment, vehicle 100 is an automobile, though in other embodiments vehicle 100 may be any suitable vehicle (such as a truck, a watercraft, or an aircraft). Vehicle 100 may be a gasoline powered vehicle, a hybrid vehicle, an electric vehicle, a fuel cell vehicle, or any other type of suitable vehicle. Vehicle 100 may include standard features, such as a dashboard, adjustable seats, one or more batteries, an engine or motor, a transmission, an HVAC system including a compressor and electronic expansion valve, a windshield and/or one or more windows, doors, a rear view mirror, a right side view mirror, a left side view mirror, seatbelts, airbags, wheels, and tires.

Figure 2:
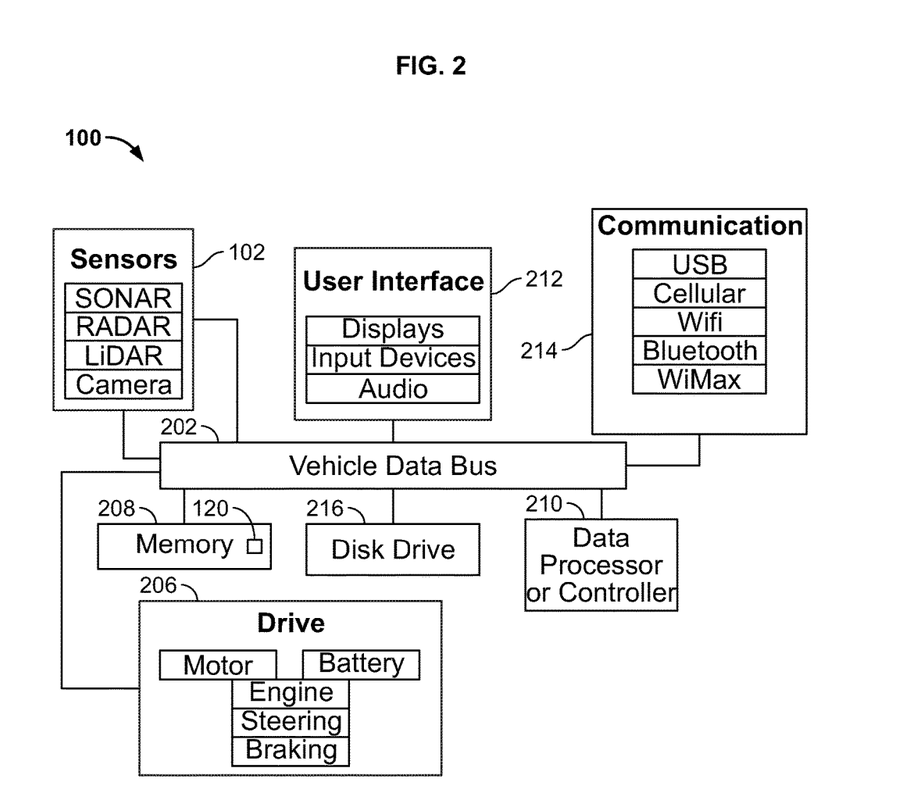
FIG. 2 illustrates a block diagram of exemplary components of the vehicle shown in FIG. 1A.

As shown in FIGS. 1A-1B and 2, vehicle 100 may include sensors 102, which may be arranged in and around the vehicle in a suitable fashion. Sensors 102 can all be the same or they can vary from one to the next. Sensors 102 may include many sensors or only a single sensor.

Certain of the sensors 102 may be configured to obtain data about the environment surrounding the vehicle (e.g., position sensors or weather sensors), as indicated by the dashed line in FIG. 1A, while others obtain data about components of the vehicle itself (e.g., gas level sensors or oil pressure sensors). The sensors 102 may be configured to transmit the data they obtain to one or more controllers of the vehicle 100, such as to controller 210 (described below), for further processing. The sensors 102 may include any suitable sensor or sensors such as, but not limited to: (1) infrared sensors; (2) visual sensors (such as cameras); (3) ultrasonic sensors; (4) RADAR; (5) LIDAR; (6) laser-scan sensors; (7) inertial sensors (for example, an inertial measurement unit); (8) wheel speed sensors; (9) road condition sensors (to directly measure certain road conditions); (10) rain sensors; (11) suspension height sensors; (12) steering wheel angle sensors; (13) steering torque sensors; (14) brake pressure sensors; (15) tire pressure sensors; or (16) vehicle location or navigation sensors (such as a Global Positioning System). Sensors 102 may include gear sensors configured to detect gear engagement of the vehicle's transmission, accelerometers configured to detect vehicle acceleration, speed sensors to detect vehicle speed, wheel speed, and/or steering wheel speed, torque sensors to detect engine or motor output torque, driveline torque, and/or wheel torque, and position sensors to detect steering wheel angular position, brake pedal position, and/or mirror position. Some sensors 102 may be mounted inside the passenger compartment of vehicle 100, around the exterior of the vehicle, or in the engine compartment of vehicle 100. At least one sensor 102 may be used to identify the vehicle's driver via facial recognition, speech recognition, or communication with a device, such as a vehicle key or mobile phone personal to the driver.

Sensors 102 may have an OFF state and various ON states. Vehicle 100, or a device operatively connected to the vehicle, may be configured to control the states or activity of the sensors. It should be appreciated that the term "internal sensors" includes all sensors mounted to the vehicle, including sensors that are mounted to an exterior of vehicle 100.

As shown in FIG. 2, in one embodiment, vehicle 100 includes a vehicle data bus 202 operatively coupled to sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WMAX; Bluetooth; near field communication (NFC); WFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of vehicle 100 to input modifications or updates to information shown in, for example, a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a one or more computer programs or subprograms 120 stored in the memory 208. When executed by the processor, the one or more computer programs or subprograms 120 generate or select instructions for other elements of the vehicle to perform. In various embodiments, the one or more computer programs or subprograms 120 are configured to direct instructions to the user interface 212, the communication devices 214, the vehicle drive 206, the sensors 102, the processor 210, and any other component operatively connected to the vehicle data bus 202. It should be appreciated that vehicle 100 may be fully autonomous or partially autonomous.

Figure 3:
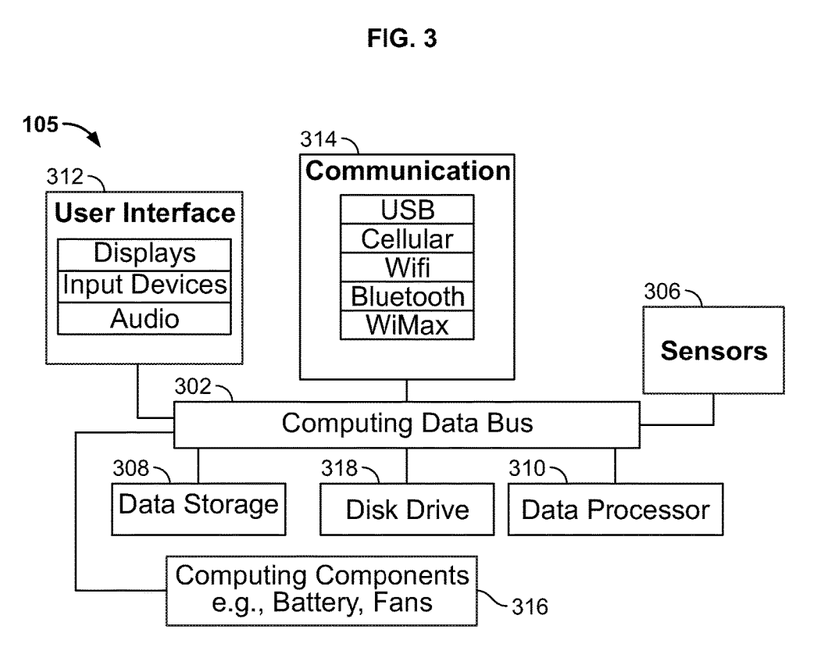
FIG. 3 illustrates a block diagram of an exemplary computing device operatively connected to the vehicle shown in FIG. 1A.

In various embodiments, a computing device 105 is operatively connected to the vehicle 100 via any suitable data connection such as WFi, Bluetooth, USB, or a cellular data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 is a mobile phone or a server.

Figure 4:
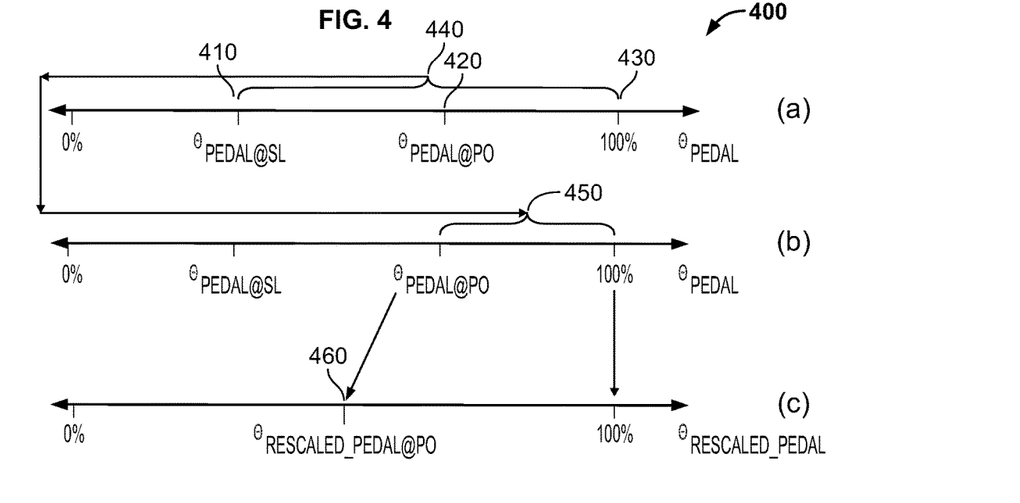
FIG. 4 illustrates an exemplary effect of rescaling pedal override position of the instant disclosure.
Figure 5:
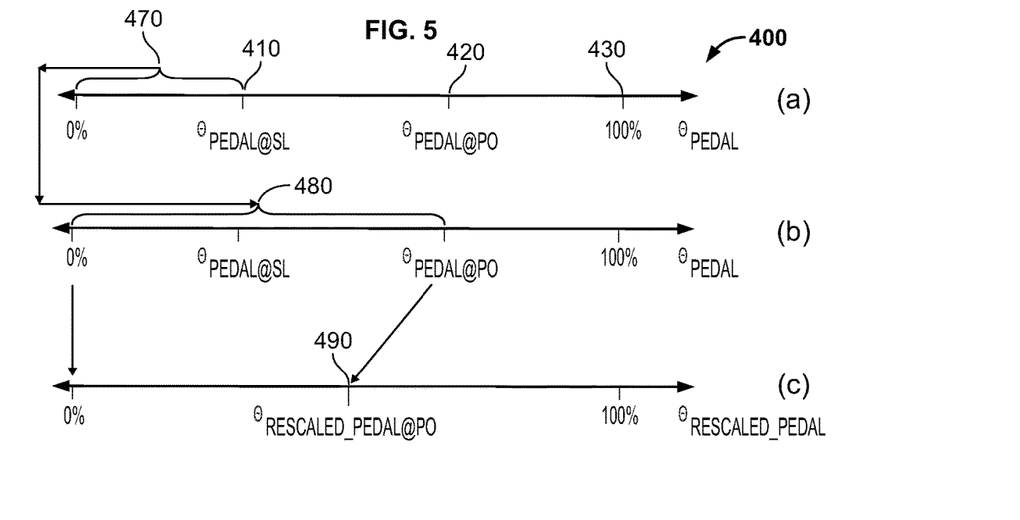
FIG. 5 illustrates an exemplary effect of rescaling pedal override position of the instant disclosure.

Turning to FIGS. 4-5, there is shown an example method 400 for providing pseudo-normal pedal behavior during pedal override. In this embodiment, pedal position may be considered to be closed at 0% and fully open at 100% pedal travel or angle. Pedal position or angle may be detected by a pedal position sensor, which may transmit the detected signal to a processor in the vehicle, such as by a vehicle speed limit override module or a powertrain control module having a processor and memory, for processing in combination with vehicle speed and acceleration data. As shown in FIG. 4(a), pedal position at which override may occur, $\ominus_{PEDAL@PO}$ (item 420) lies between the pedal position necessary to maintain the vehicle at the desired speed limit, $\ominus_{PEDAL@SL}$ (item 410) and 100% pedal travel (item 430). The range of pedal position being compressed prior to triggering pedal override is shown as item 440. After triggering pedal override, the remaining travel of the pedal is shown in FIG. 4(b). Thus, by way of example, of the pedal position to maintain vehicle speed setting of, for example, 60 mph is 45% of the total available pedal travel, and the pedal position necessary to trigger the pedal override function is 70% of the total travel, once pedal override occurs the available travel remaining in the pedal during pedal override is 30%, leaving the driver with the sensation of a compressed range of available pedal travel (item 450). To provide the driver with a consistent acceleration response once pedal override is triggered, the remaining available pedal travel may be re-scaled, as shown at item 460 in FIG. 4(c). This allows pedal override to begin at, for example, 50% rescaled pedal position for consistent performance and feel by the driver and ease of calibration of the system. Thus, for pedal positions above which override may occur:

Above $\ominus_{PEDAL@PO} \rightarrow \ominus_{SCALED\_PEDAL} = 100 - (100 - \ominus_{PEDAL})*[50/(100 - \ominus_{PEDAL@PO})]$ Using the above example for pedal positions below which override may occur, the opposite may be true. For example, as shown in FIG. 5(a), for pedal positions below the position to maintain the vehicle speed at, for example, 60 mph (item 470), this range appears to the driver to have been expanded once pedal override is triggered (item 480). To provide the driver with a consistent acceleration response once pedal override is triggered, the remaining available pedal travel may be re-scaled, as shown at item 490 in FIG. 5(c). This allows pedal override to begin at, for example, 50% rescaled pedal position for consistent performance and feel by the driver and easier of calibration of the system. Thus, for pedal positions below which override may occur:

Below $\ominus_{PEDAL@PO} \rightarrow \ominus_{SCALED\_PEDAL} = \ominus_{PEDAL}*(50/\ominus_{PEDAL@PO})$ The foregoing discussion provides the same delta rescaled pedal position regardless of whether the vehicle is heavy or light and regardless of whether the vehicle is climbing or descending from a hill.

Figure 6:
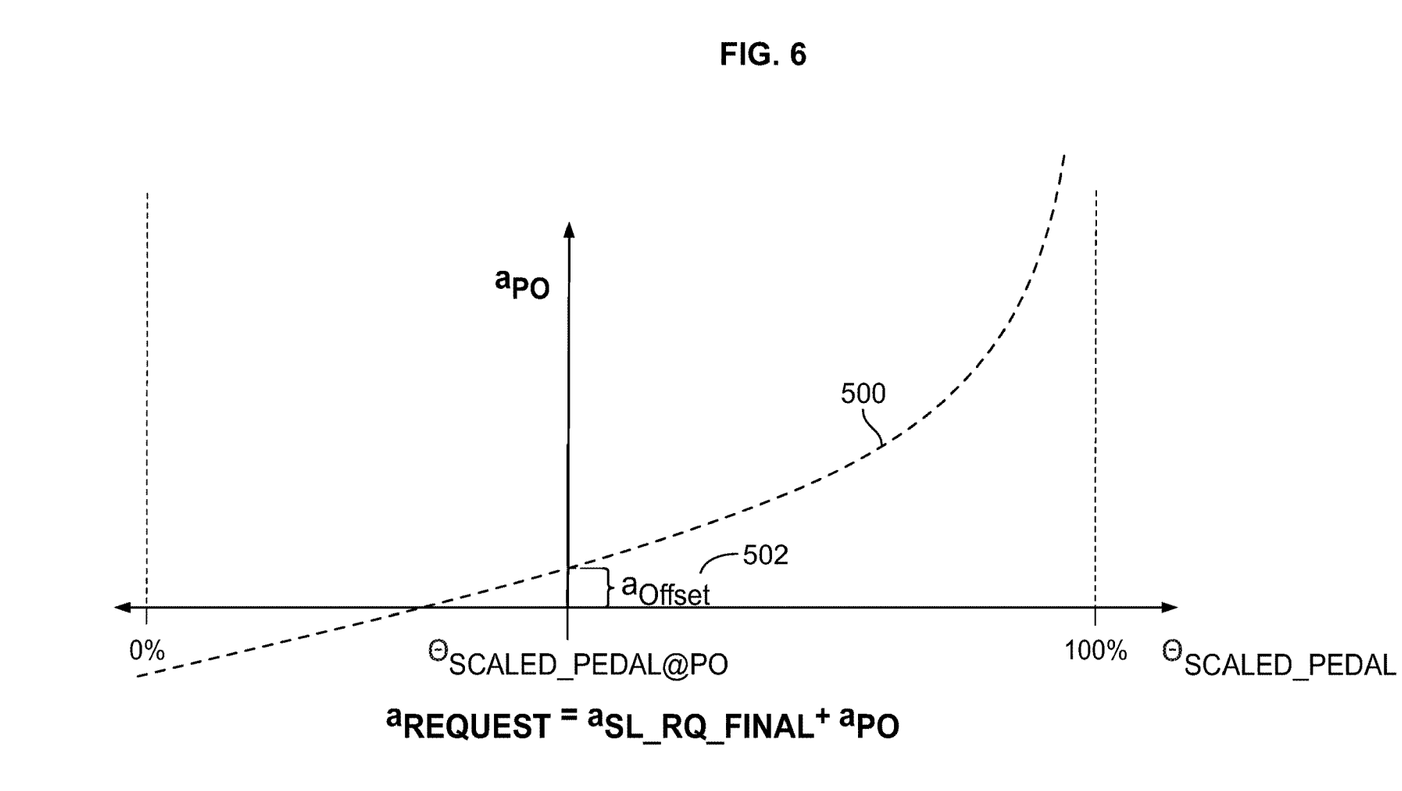
FIG. 6 illustrates an exemplary plot of pedal override acceleration request as a function of scaled pedal position.

From here, as shown in FIG. 6, a pedal override acceleration request may be constructed using $\ominus_{SCALED\_PEDAL}$ so as to (1) provide feedback to the driver that pedal override has occurred, namely $a_{Offset}$, (2) minimize large or discontinuous increases in torque requests during pedal override operation, (3) minimize dead pedal feel during pedal override operation, (4) provide a constant acceleration request for a constant pedal position during pedal override operation, and (5) for increasing pedal position beyond $\ominus_{PEDAL@PO}$, an increasing acceleration request is made, and conversely, for decreasing pedal position below $\ominus_{PEDAL@PO}$, a decreasing acceleration request is made.

More specifically, FIG. 6 shows a representative pedal override acceleration request curve 500 based on a rescaled pedal, with the y-axis representing an acceleration request at the moment of initiation of pedal override and the x-axis representing the rescaled pedal travel from 0% to 100%. At the scaled pedal position at pedal override, $\ominus_{SCALED\_PEDAL@PO}$, feedback is provided to the driver in the form of a small boost in acceleration request, represented as $a_{Offset}$ (item 502), to provide confirmation to the driver that the driver has overcome the speed limit setting. This minimizes the possibility that the vehicle lurches forward due to a relatively large acceleration request that normally would occur with relatively large pedal travel required to overcome the speed limit setting. Thus, the acceleration request after entering pedal override can be represented by:

$$a_{REQUEST} = a_{SL\_RQ\_FINAL} + a_{PO}$$

Figure 7:
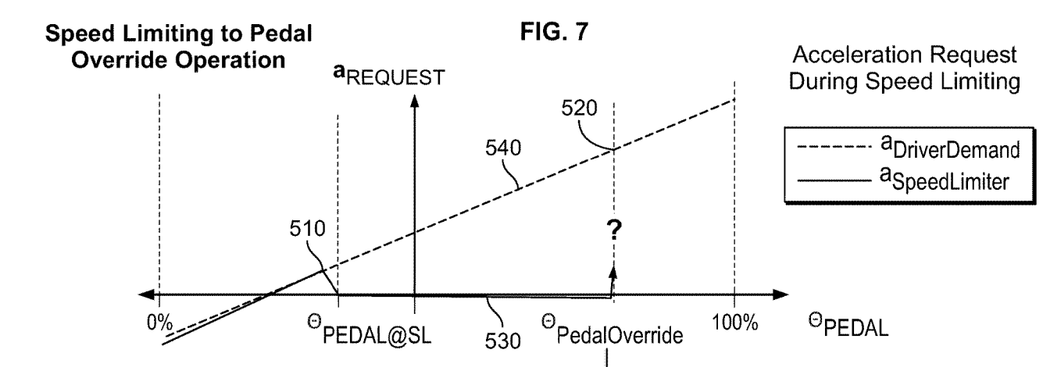
FIG. 7 illustrates an exemplary plot of acceleration request as a function of pedal position showing the transition from speed limiting to pedal override.
Figure 8:
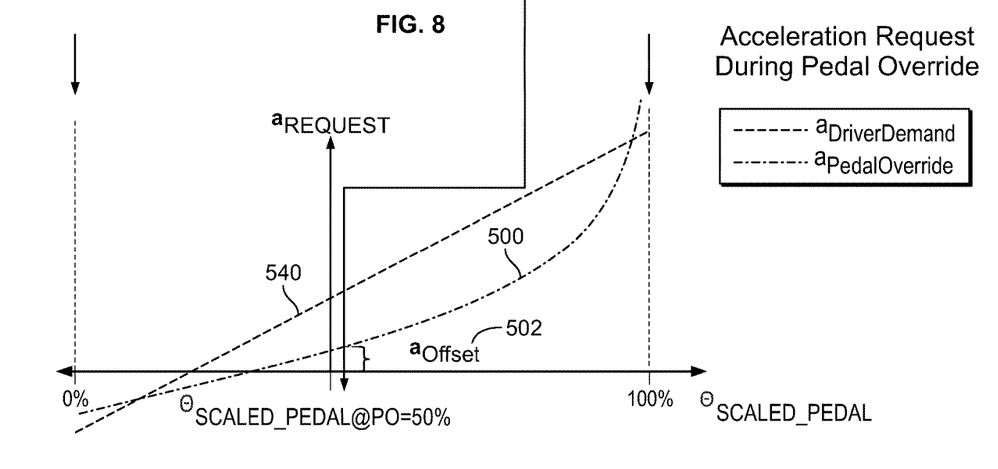
FIG. 8 illustrates an exemplary plot of acceleration request as a function of scaled pedal position showing the transition from speed limiting to pedal override.

Turning to FIGS. 7 and 8, there is shown representative behavior of acceleration requests during speed limiting (FIG. 7) and during pedal override (FIG. 8). For example, during speed limiting, vehicle acceleration may be the minimum of the two accelerations—the acceleration at $\ominus_{PEDAL@SL}$ or the $\ominus_{PEDAL@PO}$. Upon triggering pedal override, the goal is to suspend or exit speed limiting (item 530)

and return to normal driver demand (item 540), but there may be a large difference in the magnitude of the two accelerations, as shown in FIG. 7 at items 510 and 520, respectively.

To minimize the difference and a possibility of a surge in vehicle acceleration request, a transition to pedal override operation is shown in FIG. 8. During pedal override, vehicle acceleration may still be the minimum of the two accelerations. But rescaling the pedal and using an acceleration limit that is a function of the rescaled pedal position allows for a pseudo-normal accelerator pedal behavior.

Figure 9:
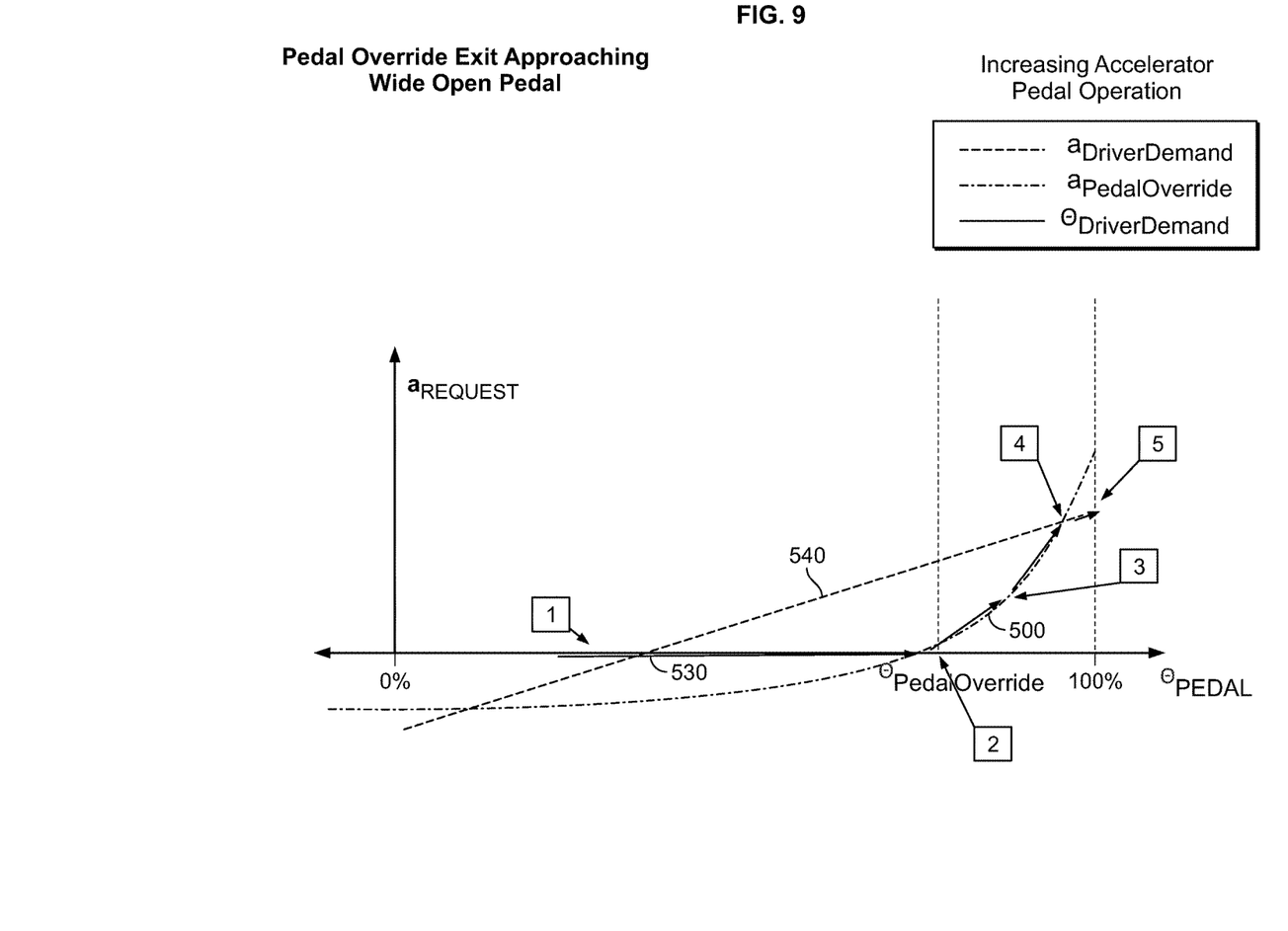
FIG. 9 illustrates an exemplary plot of acceleration request as a function of pedal position showing the exit of pedal override as pedal position increases toward maximum pedal position.
Figure 10:
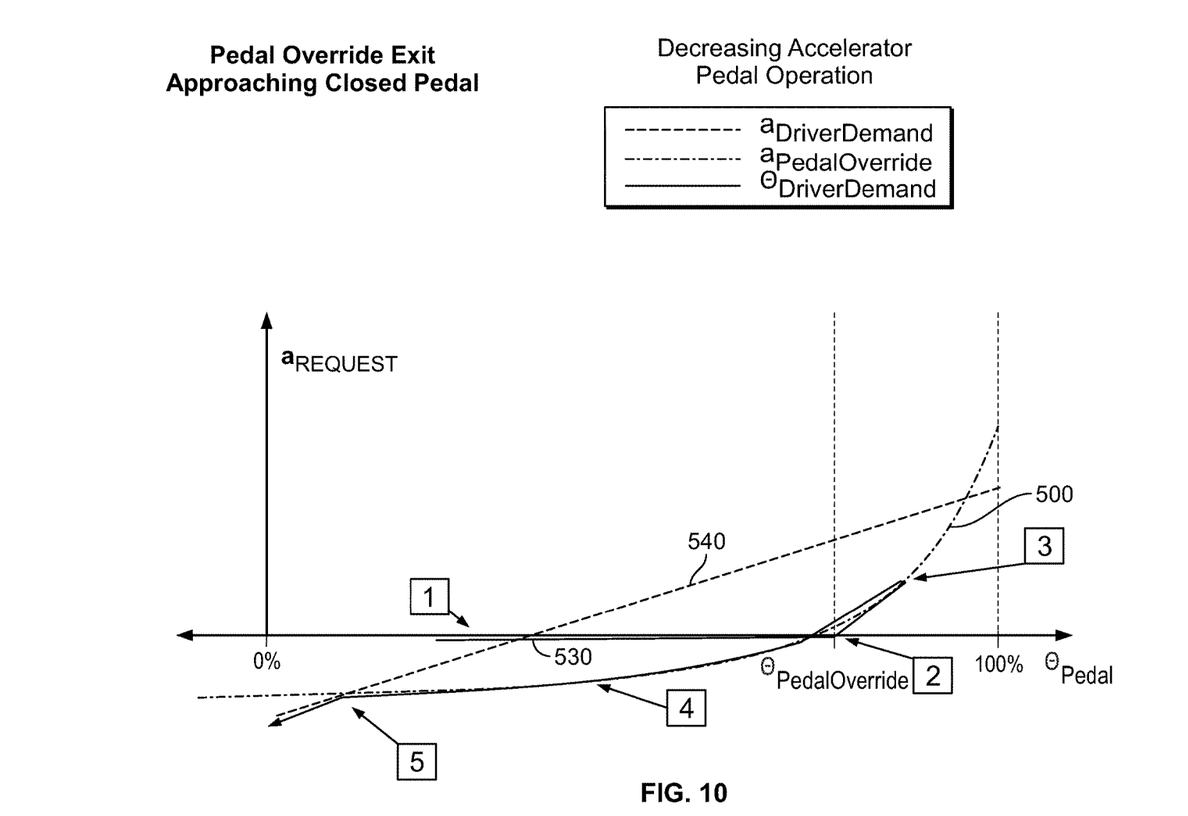
FIG. 10 illustrates an exemplary plot of acceleration request as a function of pedal position showing the exit of pedal override as pedal position decreased toward a closed pedal position.

Turning to FIGS. 9 and 10, there is shown representative solutions for exiting pedal override—when approaching wide open pedal (FIG. 9) and when approaching closed pedal (FIG. 10). More particularly, FIG. 9 shows a representative entry of pedal override functionality from a speed limiting set point coupled with exit of pedal override functionality when approaching wide open pedal (i.e., near maximum pedal travel), where the acceleration request (y-axis) as function of pedal travel (x-axis). For example, FIG. 9 point 1 shows the vehicle in speed limiting (curve 530) and where the driver increases pedal travel to initiate pedal override of the speed limiting function. At FIG. 9, point 2, pedal override is triggered (i.e., $\ominus_{PedalOverride}$). Further increases in pedal travel results in vehicle acceleration while in pedal override mode due to a pedal override acceleration request, $a_{PedalOverride}$, as represented at point 3 (curve 500). As the driver continues to increase pedal position, at point 4 the pedal override acceleration request curve 500 intersects with the driver demand acceleration request curve 540, causing pedal override to be exited and the acceleration request continuing thereafter along the normal driver demand acceleration request curve 540 for increasing pedal travel, as shown at point 5.

FIG. 10 shows what happens when a decreasing accelerator pedal approaches a closed pedal condition. For example, FIG. 10 point 1 shows the vehicle in speed limiting (curve 530) and where the driver increases pedal travel to initiate pedal override of the speed limiting function. At FIG. 10, point 2, pedal override is triggered (i.e., $\ominus_{PedalOverride}$). Further increases in pedal travel results in vehicle acceleration while in pedal override mode due to a pedal override acceleration request, $a_{PedalOverride}$, as represented at point 3 (curve 500). As the driver decreases pedal position below the pedal override trigger point, $\ominus_{PedalOverride}$, the acceleration request decreases below the x-axis (i.e., indicative of deceleration request) along curve 500 to point 4. As the driver continues to decrease pedal position, at point 5 the pedal override acceleration request curve 500 intersects with the driver demand acceleration request curve 540, causing pedal override to be exited and the acceleration request continuing thereafter along the normal driver demand acceleration request curve 540 for decreasing pedal travel.

Another consideration is that with a rescaled pedal, as disclosed herein, there may be a relatively large amount of pedal travel below the pedal override initiation point. A driver may perceive a tip-out to tip-in of the pedal to feel like a dead pedal, where nothing happens in terms of acceleration despite the driver's movement of the pedal. To solve this problem, the pedal override trigger point may be caused to re-initialize on tip-in of the accelerator pedal, causing positive acceleration to return on tip-in.

Figure 11:
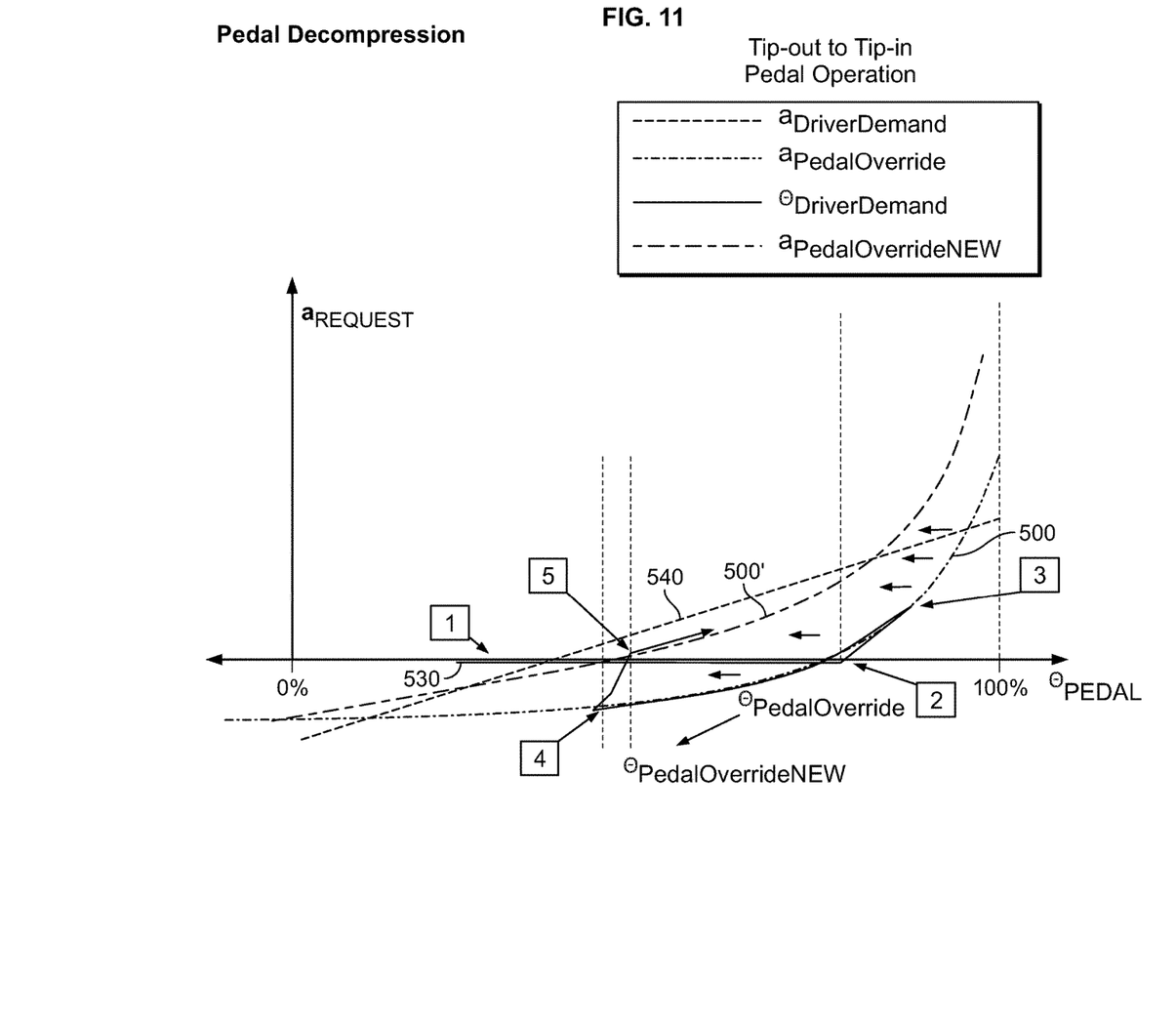
FIG. 11 illustrates an exemplary plot of acceleration request as a function of pedal position showing decompression of the pedal travel during repetitive entrance and exit of pedal override.

FIG. 11 shows a representative example of how this may work. For example, FIG. 11 point 1 shows the vehicle in speed limiting (curve 530) and where the driver increases pedal travel to initiate pedal override of the speed limiting function. At FIG. 11, point 2, pedal override is triggered (i.e., $\ominus_{PedalOverride}$). Further increases in pedal travel results in vehicle acceleration while in pedal override mode due to a pedal override acceleration request, $a_{PedalOverride}$, as represented at point 3 (curve 500). As the driver decreases pedal position below the pedal override trigger point, $\ominus_{PedalOverride}$, the acceleration request decreases below the x-axis (i.e., indicative of deceleration request) along curve 500 to point 4. When the driver once again increases pedal position, pedal override functionality is reinitialized at the new pedal override position (i.e., $\ominus_{PedalOverrideNEW}$), resulting immediately in a new acceleration request ($a_{pedalOverrideNEW}$) without a dead pedal feel to the driver, as represented along curve 500'.

In another embodiment, the system may be configured to prevent decreasing VSL from triggering pedal override. More specifically, since the pedal override trigger point may be based on the driver set speed limit, it is possible that the driver could have the pedal pressed just less than the pedal override trigger point and then decrease the speed limit. Since the pedal override trigger point may decrease with the new speed limit setting, which may inadvertently trigger a pedal override. To detect and address this possibility, the system may be configured to inhibit entering pedal override unless the driver increases the pedal position a desirable amount, for example approximately 3% over the speed limit setting, before the pedal is decreased to less than the new pedal override trigger point.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A system for overriding a vehicle speed limit setting via accelerator pedal override, comprising:
a vehicle including:
an accelerator pedal;
a memory to store a fixed pedal override margin; and
a processor in communication with the pedal and the memory and configured to:
determine an override threshold using the speed limit setting and the fixed pedal override margin; and
enter an override mode when a position of the pedal exceeds the override threshold.

2. The system of claim 1, wherein the processor is configured to receive pedal position data.

3. The system of claim 1, wherein the speed limit setting is based on a nominal pedal position value and a vehicle load compensation value.

4. The system of claim 1, wherein the processor is configured to provide feedback to a driver to indicate that pedal override has occurred.

5. The system of claim 4, wherein the feedback includes a desired vehicle acceleration offset from a current vehicle acceleration to enable the driver to feel when the pedal override is triggered.

6. The system of claim 1, wherein the processor is configured to exit the pedal override mode when a pedal override acceleration request associated with the pedal position becomes greater than a driver demand acceleration request associated with the pedal position.

7. The system of claim 1, wherein the processor is configured to exit the pedal override mode when a pedal override acceleration request associated with the pedal position becomes less than the override threshold and greater than a driver demand acceleration request associated with the pedal position.

8. A vehicle comprising:
an accelerator pedal;
a memory to store a fixed pedal override margin;
a processor in communication with the accelerator pedal and the memory and configured to:
 determine an actual speed limit position value of the pedal associated with a vehicle speed limit setting;
 determine an override threshold position value of the pedal using the actual speed limit position value and the fixed pedal override margin; and
 enter an override mode to override the vehicle speed limit setting when a position value of the accelerator pedal exceeds the override threshold position value.

9. The vehicle of claim 8, wherein the actual speed limit position value is based on a nominal speed limit position value for the vehicle speed limit setting and a position compensation value.

10. The vehicle of claim 9, wherein the position compensation value is based on a mass of the vehicle and a grade of a road.

11. The vehicle of claim 8, wherein the actual speed limit position value is based on engine torque and engine speed at the vehicle speed limit setting.

12. The vehicle of claim 8, wherein the accelerator pedal comprises a position sensor to generate the pedal position value.

13. The vehicle of claim 12, wherein the processor is configured to receive pedal position value data from the position sensor.

14. The vehicle of claim 8, wherein the processor is configured to accelerate the vehicle by a predetermined acceleration offset when the override mode is entered.

15. The vehicle of claim 8, wherein the processor is configured to exit the override mode when a pedal override acceleration request associated with the pedal position value matches a driver demand acceleration request associated with the pedal position value.

16. A method comprising:
determining, with a processor of a vehicle, an actual speed limit position value of an accelerator pedal of the vehicle associated with a vehicle speed limit setting;
determining, with the processor, an override threshold position value of the pedal using the actual speed limit position value and a fixed pedal override margin; and
entering, with the processor, an override mode to override the vehicle speed limit setting when a position value of the accelerator pedal exceeds the override threshold position value.

17. The method of claim 16, wherein the actual speed limit position value is based on a nominal speed limit position value for the vehicle speed limit setting and a position compensation value.

18. The method of claim 16, wherein the actual speed limit position value is based on engine torque and engine speed at the vehicle speed limit setting.

19. The method of claim 16, further comprising accelerating, with the processor, the vehicle by a predetermined acceleration offset when the override mode is entered.

20. The method of claim 16, further comprising exiting, with the processor, the override mode when a pedal override acceleration request associated with the pedal position value matches a driver demand acceleration request associated with the pedal position value.

\* \* \* \* \*